US009242256B2

(12) United States Patent
Clark et al.

(10) Patent No.: US 9,242,256 B2
(45) Date of Patent: Jan. 26, 2016

(54) AEROSOL DISPENSER ASSEMBLY HAVING VOC-FREE PROPELLANT AND DISPENSING MECHANISM THEREFOR

(75) Inventors: Paul A. Clark, Racine, WI (US); Richard S. Valpey, III, Lindenhurst, IL (US); Prabodh Padma Varanasi, Racine, WI (US); Jeffrey J. Christianson, Oak Creek, WI (US); Nitin Sharma, Kenosha, WI (US); Milind A. Jog, Mason, OH (US)

(73) Assignee: S.C. Johnson & Son, Inc., Racine, WI (US)

( * ) Notice: Subject to any disclaimer, the term of this patent is extended or adjusted under 35 U.S.C. 154(b) by 1130 days.

(21) Appl. No.: 11/778,912

(22) Filed: Jul. 17, 2007

(65) Prior Publication Data

US 2009/0020621 A1 Jan. 22, 2009

(51) Int. Cl.
| | |
|---|---|
| B05B 17/04 | (2006.01) |
| A62C 5/02 | (2006.01) |
| A62C 13/62 | (2006.01) |
| B05B 9/04 | (2006.01) |
| B05B 1/26 | (2006.01) |
| B05B 1/30 | (2006.01) |
| B05B 1/34 | (2006.01) |
| B05B 1/14 | (2006.01) |
| B65D 83/20 | (2006.01) |
| C09K 3/30 | (2006.01) |

(Continued)

(52) U.S. Cl.
CPC ............. *B05B 1/3442* (2013.01); *B05B 1/14* (2013.01); *B05B 1/3436* (2013.01); *B65D 83/205* (2013.01); *B65D 83/28* (2013.01); *C09K 3/30* (2013.01); *B65D 83/48* (2013.01); *B65D 83/752* (2013.01)

(58) Field of Classification Search
CPC ...... B05B 1/14; B05B 1/3436; B05B 1/3442; C09K 3/30; B65D 83/28; B65D 83/205; B65D 83/48; B65D 83/752
USPC ............... 239/11, 5, 296, 334, 347, 306, 106, 239/372, 414, 565, 573, 579, 527, 8, 340, 239/373, 544, 543, 404; 222/402.1
See application file for complete search history.

(56) References Cited

U.S. PATENT DOCUMENTS 3,112,885 A * 12/1963 Bell et al. ............... 239/394
3,209,954 A * 10/1965 Webster ............... 222/189.1

(Continued)

OTHER PUBLICATIONS

Yang, Jing-Tang et al., "Microfabrication and Laser Diagnosis of Pressure-Swirl Atomizers", Journal of Microelectromechanical Systems, vol. 13, No. 5, Oct. 2004.

(Continued)

*Primary Examiner* — Len Tran
*Assistant Examiner* — Steven M Cernoch (57) ABSTRACT

An aerosol dispenser assembly is disclosed that includes a container holding a liquid product and a compressed gas propellant for propelling the liquid product from the container. A design methodology for the actuator body and swirl nozzle insert is disclosed for maintaining a small particle size or Sauter Mean Diameter (D[3, 2]) of less than 48 μm at a suitable spray rate (1.5-2 g/s), while utilizing a compressed gas VOC-free propellant for an air freshener product. As obtaining reduced particle size to compete with LPG propellants may result in a reduced spray rate, it is anticipated that one or more nozzles may be designed into the actuator body to maintain a suitable spray rate.

18 Claims, 6 Drawing Sheets

(51) Int. Cl.
  *B65D 83/28* (2006.01)
  *B65D 83/48* (2006.01)
  *B65D 83/14* (2006.01)

(56) References Cited

U.S. PATENT DOCUMENTS

| | | | |
|---|---|---|---|
| 3,531,048 A * | 9/1970 | Hughes | 239/1 |
| 3,568,933 A * | 3/1971 | Macguire-Cooper | 239/543 |
| 3,578,220 A * | 5/1971 | Green et al. | 222/402.13 |
| 3,583,642 A | 6/1971 | Crowell et al. | |
| 3,613,728 A * | 10/1971 | Steiman | 137/614.19 |
| 3,658,294 A | 4/1972 | Ewald | |
| 3,690,515 A | 9/1972 | Ewald | |
| 3,945,574 A | 3/1976 | Polnauer | |
| 3,970,219 A * | 7/1976 | Spitzer et al. | 222/1 |
| 3,972,473 A * | 8/1976 | Harrison | 239/34 |
| 3,994,442 A * | 11/1976 | Hoening | 239/472 |
| 4,030,667 A * | 6/1977 | Le Guillou | 239/573 |
| 4,035,303 A * | 7/1977 | Ufferfilge | 210/316 |
| RE29,405 E | 9/1977 | Gunzel et al. | 239/318 |
| 4,124,149 A * | 11/1978 | Spitzer et al. | 222/402.19 |
| 4,141,472 A * | 2/1979 | Spitzer et al. | 222/189.01 |
| 4,260,110 A | 4/1981 | Werding | 239/404 |
| 4,322,037 A * | 3/1982 | Heeb et al. | 239/337 |
| 4,413,755 A | 11/1983 | Brunet | |
| 4,418,847 A | 12/1983 | Beard | |
| 4,546,905 A * | 10/1985 | Nandagiri et al. | 222/189.1 |
| 4,717,074 A * | 1/1988 | Karliner et al. | 239/288 |
| 4,882,055 A | 11/1989 | Stamstad | |
| 5,074,440 A | 12/1991 | Clements et al. | |
| 5,152,463 A | 10/1992 | Mao et al. | |
| 5,249,747 A * | 10/1993 | Hanson et al. | 239/373 |
| 5,358,179 A | 10/1994 | Lund et al. | |
| 5,396,884 A * | 3/1995 | Bagwell et al. | 128/200.21 |
| 5,397,059 A * | 3/1995 | Baudin | 239/333 |
| 5,472,143 A | 12/1995 | Bartels et al. | |
| 5,560,544 A * | 10/1996 | Merritt et al. | 239/104 |
| 5,664,732 A * | 9/1997 | Smolen et al. | 239/121 |
| 5,711,488 A * | 1/1998 | Lund | 239/333 |
| 5,722,598 A * | 3/1998 | Werding | 239/403 |
| 5,738,252 A | 4/1998 | Dodd et al. | |
| 5,738,282 A * | 4/1998 | Grogan | 239/492 |
| 6,123,268 A * | 9/2000 | Chastine | 239/1 |
| 6,152,384 A * | 11/2000 | Lopez et al. | 239/284.1 |
| 6,155,496 A * | 12/2000 | Brunet et al. | 239/333 |
| 6,371,389 B1 * | 4/2002 | Bickart et al. | 239/491 |
| 6,378,787 B1 | 4/2002 | Buchi et al. | |
| 6,405,945 B1 * | 6/2002 | Dobrin | 239/463 |
| 6,446,882 B1 * | 9/2002 | Dukes et al. | 239/333 |
| 6,474,569 B1 | 11/2002 | Brundish et al. | |
| 6,491,187 B2 | 12/2002 | Walters | |
| 6,517,012 B1 | 2/2003 | Slowik et al. | |
| 6,824,079 B2 * | 11/2004 | Kendrick et al. | 239/343 |
| 6,833,072 B1 | 12/2004 | Krestine et al. | |
| 6,942,125 B2 * | 9/2005 | Marelli | 222/321.4 |
| 6,966,467 B2 | 11/2005 | Di Giovanni et al. | |
| 6,978,915 B1 | 12/2005 | Russell | |
| 6,978,946 B2 | 12/2005 | Sweeton | |
| 6,997,397 B1 * | 2/2006 | Keung et al. | 239/333 |
| 7,014,127 B2 * | 3/2006 | Valpey et al. | 239/337 |
| 7,121,434 B1 * | 10/2006 | Caruso | 222/402.13 |
| 7,137,536 B2 | 11/2006 | Walters et al. | |
| 7,143,959 B2 * | 12/2006 | Smith et al. | 239/354 |
| 7,182,227 B2 | 2/2007 | Poile et al. | |
| 7,195,139 B2 | 3/2007 | Jaworski et al. | |
| 7,232,080 B2 * | 6/2007 | Kutay et al. | 239/398 |
| 7,246,722 B2 | 7/2007 | Walters et al. | |
| 7,350,676 B2 | 4/2008 | Di Giovanni et al. | |
| 2003/0150937 A1 * | 8/2003 | Laidler et al. | 239/340 |
| 2004/0050970 A1 | 3/2004 | Bowman et al. | |
| 2004/0256490 A1 | 12/2004 | Sweeton | |
| 2005/0017026 A1 | 1/2005 | Yerby et al. | |
| 2005/0017093 A1 | 1/2005 | Schroeder et al. | |
| 2005/0023368 A1 * | 2/2005 | Valpey et al. | 239/1 |
| 2006/0026817 A1 * | 2/2006 | Valpey et al. | 29/592 |
| 2006/0049282 A1 | 3/2006 | Bowman et al. | |
| 2008/0067262 A1 * | 3/2008 | Varanasi et al. | 239/13 |
| 2008/0093392 A1 | 4/2008 | Abduljalil | |

OTHER PUBLICATIONS

Gordon, William G. et al., "*Pharmaceutical Aerosol Terminology*", Spray Technology & Marketing, 7 pages.
Jog, J. Xue, et al., "*Effect of Geometric Parameters on Simplex Atomizer Performance*", AiAA Journal, vol. 41, No. 12, Dec. 2004, 8 Pages.
Rawle, Alan, "*Basic Principles of Particle Size Analysis*", Malvern Instruments Limited, Worcestersire, U.K., 7 Pages.
Bayvel be & Orzechowski, "*Liquid Atomization*", 1993, 2 Pages.

* cited by examiner

Metal Inserts 21

| Ls | dp | β | D | Ds | θc | Lo | do | Lt | θt | PSIG | N | SMD D[3,2] | Spray Rate | RSF |
|---|---|---|---|---|---|---|---|---|---|---|---|---|---|---|
| 175 | 175 | 90 | 2418 | 1184 | 90 | 205 | 206 | 595 | 66 | 60 | 4 | 49.1 | 0.87 | 1.21 |
| 175 | 175 | 90 | 2418 | 884 | 90 | 205 | 300 | 595 | 66 | 60 | 2 | 65.7 | 0.27 | 0.83 |
| 355 | 234 | 90 | 2418 | 1776 | 90 | 205 | 300 | 595 | 66 | 60 | 2 | 52.6 | 0.81 | 1.27 |
| 175 | 175 | 90 | 2418 | 884 | 90 | 205 | 200 | 595 | 66 | 60 | 2 | 48.2 | 0.43 | 1.26 |

FIG. 7B

Plastic Inserts 21

| Ls | dp | β | D | Ds | θc | Lo | do | Lt | θt | PSIG | N | SMD D[3,2] | Spray Rate | RSF |
|---|---|---|---|---|---|---|---|---|---|---|---|---|---|---|
| 355 | 234 | 90 | 2418 | 884 | 90 | 205 | 228 | 595 | 66 | 135 | 4 | 50.1 | 0.83 | 1.19 |
| 355 | 234 | 90 | 2418 | 884 | 90 | 205 | 330 | 595 | 66 | 135 | 4 | 72 | 1.82 | 1.14 |

AEROSOL DISPENSER ASSEMBLY HAVING VOC-FREE PROPELLANT AND DISPENSING MECHANISM THEREFOR

BACKGROUND

1. Technical Field

Improved aerosol dispenser systems are disclosed. More specifically, aerosol dispenser systems using a compressed gas propellant to expel a liquid product from a container are disclosed wherein the compressed gas propellant is innocuous and VOC-free. Still more specifically, the nozzle, i.e., a combination of the insert and actuator body, are designed with one or more parameters optimized to provide an aerosol spray generated using a VOC-free propellant that has properties equivalent or comparable to that of an aerosol spray generated using a liquefied petroleum gas (LPG) propellant. As a result, an effective aerosol system is disclosed that provides a sufficiently small particle size without depending upon conventional hydrocarbon-based propellants.

2. Description of the Related Art

Aerosol dispensers have been commonly used to dispense personal, household, industrial, and medical products, and provide low cost, easy to use methods of dispensing products that are best used as an airborne mist or as a thin coating on surfaces. Typically, aerosol dispensers include a container, which holds a liquid product to be dispensed, such as soap, insecticide, paint, deodorant, disinfectant, air freshener, or the like. A propellant is used to discharge the liquid product from the container. The propellant is pressurized and provides a force to expel the liquid product from the container when a user actuates the aerosol dispenser by pressing an actuator button or trigger.

The two main types of propellants used in aerosol dispensers today include (1) liquefied gas propellants, such as hydrocarbon and hydrofluorocarbon (HFC) propellants, and (2) compressed gas propellants, such as compressed carbon dioxide or nitrogen. To a lesser extent, chlorofluorocarbon propellants (CFCs) have been used. The use of CFCs, however, has essentially been phased out due to the potentially harmful effects of CFCs on the environment.

In an aerosol dispenser using a liquefied petroleum gas-type propellant (LPG), the container is loaded with liquid product and LPG propellant to a pressure approximately equal to the vapor pressure of the LPG. After being filled, the container still has a certain amount of space that is not occupied by liquid. This space is referred to as the "head space." Since the container is pressurized to approximately the vapor pressure of the LPG propellant, some of the LPG is dissolved or emulsified in the liquid product. The remainder of the LPG remains in the vapor phase and fills the head space. As the product is dispensed, the pressure in the container remains approximately constant as liquid LPG moves from the liquid phase to the vapor phase thereby replenishing discharged LPG propellant vapor.

In contrast, compressed gas propellants largely remain in the vapor phase. That is, only a relatively small portion of the compressed gas propellant is in the liquid-phase. As a result, the pressure within a compressed gas aerosol dispenser assembly decreases as the vapor is dispensed.

While this aspect is of using compressed gas propellants is disadvantageous, the use of compressed gas propellants may gain favor in the future as they typically do not contain volatile organic compounds (VOCs). Indeed, LPGs are considered to be a VOC thereby making their use subject to various regulations and therefore disadvantageous.

One way to reduce the VOC content in LPG-type aerosols is to reduce the amount of LPG used to dispense the liquid product without adversely affecting the product performance. Specifically, before the techniques of commonly assigned U.S. Pat. No. 7,014,127 to Valpey et al. (incorporated herein by reference), reducing the LPG content in commercial aerosol canned products resulted in excessive product remaining in the container after the LPG is depleted ("product r this etention"), increased particle size, and reduced spray rate, particularly as the container nears depletion. Techniques disclosed in the '127 patent provide a way to minimize the particle size of a dispensed product in order to maximize the dispersion of the particles in the air and to prevent the particles from "raining" or "falling out" of the air, while reducing the amount of liquefied gas-type propellant to 15-25% by weight. By reducing the amount of LPG in the container, the VOCs for the product are reduced.

The techniques of the '127 patent involve maintaining a Clark/Valpey (CV) value for the system at 25 or less, where $CV=2.5(D-32)+10|Q-1.1|+2.6R$, D is the average diameter in micrometers of particles dispensed during the first forty seconds of spray of the assembly, Q is the average spray rate in grams/second during the first forty seconds of spray of the assembly, and R is the amount of the product remaining in the container at the end of the life of the assembly expressed as a percentage of the initial fill weight.

A method of reducing the particle size for LPG aerosol systems is disclosed in commonly assigned U.S. Pat. No. 3,583,642 to Crowell et al., which is also incorporated herein by reference. The '642 patent discloses various spray heads or actuator bodies that incorporate a "breakup bar" for inducing turbulence in a product/propellant mixture prior to the mixture being discharged from the nozzle outlet orifice. Such turbulence contributes to reducing the size of the mixture particles discharged through the outlet orifice of the actuator body. While the '642 patent discloses one-piece actuator bodies with breakup bars, breakup bars have also been incorporated into smaller nozzle inserts that fit into actuator bodies.

To provide an alternative to LPG propellants and to eliminate any VOCs attributable to the propellant of an aerosol product, improved aerosol dispensing systems incorporating VOC-free compressed gas propellants are needed. However, to satisfy consumers, the employment of VOC-free compressed gas propellants should result in aerosols with properties equivalent or comparable to that of aerosols generated using LPG propellants. One such physical property for measuring the effectiveness of certain types and aerosols is the particle size or diameter as indicated by the Sauter Mean Diameter.

The Sauter Mean Diameter (also referred to as "D[3,2]") is defined as the diameter of a droplet having the same volume/surface ratio as the entire spray. Conventional liquefied gas-type aerosol systems provide Sauter Mean Diameters at or below in 35 μm. If the performance of compressed gas propellant systems differ, users will observe the differences. These differences can be perceived to be beneficial or they can be related to efficacy. Sauter Mean Diameter is defined in a number of articles/presentations published by Malvern Instruments Limited (www.malvern.co.uk; see, e.g., Rawle, "Basic Principles of Particle Size Analysis").

The small droplet size of conventional aerosol systems is obtained primarily by maintaining pressure in the aerosol can. When LPG propellant exits an aerosol can, it instantaneously changes phase from a liquid to a gas. When a liquid turns to a gas, the volume expands instantly by factors of a thousand or more. This resulting burst of energy breaks the liquid product carried with the propellant in the dispense stream into tiny droplets. Because compressed gas propellants are already in the gas phase, this burst of energy provided by liquid propellants is absent.

Published U.S. Patent Applications 2005/0023368 and 2006/0026817 both disclosed methods of designing improved aerosol spray dispensers that include optimizing certain parameters including vapor tap diameter, dip tube inner diameter, actuator body orifice dimensions, stem orifice diameter, land length, exit orifice size, and stem cross sectional area. However, these references are directed toward systems employing lower levels of VOCs, not the complete elimination of VOCs.

Thus, what is needed is an improved methodology for optimizing aerosol spray dispenser assemblies that rely upon VOC-free compressed gas propellants and improved nozzles (actuator bodies and swirl nozzle inserts) for use with VOC-free compressed gas propellants that provides the requisite properties (e.g., small particle size) and spray rate demanded by consumers.

SUMMARY OF THE DISCLOSURE

An aerosol dispenser assembly is provided that comprises a container holding a liquid product and a compressed gas propellant for propelling the liquid product from the container. This disclosure is directed primarily at the design of the actuator body and swirl insert for maintaining a small particle size or Sauter Mean Diameter (D[3, 2]) of less than 48 µm at a suitable spray rate (1.5-2 g/s), while utilizing a compressed gas VOC-free propellant for an aerosol dispensed product. As obtaining reduced particle size to compete with LPG propellants may result in a reduced spray rate, it is anticipated that one or more nozzles may be used to maintain a suitable spray rate.

The maximum particle size and minimum spray rate will vary depending upon the particular product being dispensed. While the examples of this disclosure are directed toward air freshener products, the concepts disclosed herein are not limited to air fresheners, which comprise mostly water, small amounts of alcohol and very small amounts of fragrance oil. One particular product that is applicable to the concepts of this disclosure is insecticide products as well as combinations of insecticide and air freshener products. For purposes of this disclosure, dispensed products can include aqueous solutions of any combination of stabilizers, surfactants, corrosion inhibitors, fragrance oils, cleaners, soaps, insecticides and insect repellents.

Referring first to the swirl nozzle insert design, in an embodiment, an insert made in accordance with this disclosure comprises a cylindrical side wall connected to an end wall. The cylindrical sidewall defines an open bottom which frictionally and mateably receives a post disposed within a nozzle chamber of an actuator body. The end wall of the insert comprises a recess that defines a swirl chamber and an outlet orifice connected to or disposed within the swirl chamber. The end wall further comprises at least one inlet slot extending inward from a junction of the cylindrical sidewall and end wall towards the swirl chamber. The number of inlet slots can vary and will typically range from 1 to 6. Embodiments utilizing two, three and four inlet slots are disclosed herein but inserts with greater than four inlet slots and only a single inlet slot are considered within the scope of this disclosure.

The outlet orifice has a diameter $d_o$. The recess that defines swirl chamber has a diameter $D_s$. Each inlet slot has a width $d_p$, a height Ls, and a cross-sectional area $d_p \times L_s$.

In swirl nozzle design strategy disclosed herein, the parameters $d_o$, $D_s$ and a cumulative inlet slot cross-sectional area ($d_p \times L_s \times N$) is optimized to maintain a Sauter Mean Diameter (D[3,2]) of fluid particles exiting the outlet orifice to less than 48 µm.

In one refinement, the outlet orifice diameter $d_o$ is less than about 210 µm. In another refinement, the swirl chamber diameter $D_s$ is at least about 1100 µm. The swirl chamber diameter may be as large as 2000 to 3000 µm. Accordingly, the swirl chamber diameter $D_s$ can range from about 1100 to about 3000 µm. In another refinement, the cumulative inlet slot cross-sectional area, $d_p \times L_s \times N$, is less than about 30,625 µm².

Other swirl nozzle insert design strategies involve using parameters in addition to or instead of combinations of the orifice diameter $d_o$, the swirl chamber diameter $D_s$ and cumulative inlet slot cross-sectional area ($d_p \times L_s \times N$). Additional design parameters are derived from the following physical relationships. For example, the cylindrical sidewall of the insert which defines an open bottom for receiving a post and the cylindrical sidewall has an inner diameter D.

As noted above, the end wall comprises a recess that defines a swirl chamber having a diameter $D_s$, an outlet orifice having a diameter $d_o$, and N inlet slots extending inward the cylindrical sidewall to the swirl chamber, each inlet slot having a cross-sectional area $d_p \times L_s$. The inlet slot(s) enter the swirl chamber at an angle β with respect to an axis of the outlet orifice. An inner surface of the swirl chamber encircles the outlet orifice and is disposed at an angle $\theta_c$ with respect to the axis of the outlet orifice. The outlet orifice has an axial length $L_o$. The end wall of the insert comprising an outer trumpet surface having an axial length $L_t$ that extends beyond the outlet orifice. The trumpet surface has an angle $\theta_t$ with respect to the axis of the outlet orifice.

At least one design parameter utilized for optimization is selected from the group consisting of $d_o$, $D_s$, a cumulative inlet slot cross-sectional area ($d_p \times L_s \times N$), $L_s$, $d_p$, β, D, $\theta_c$, $L_o$, $L_t$, $\theta_t$, and N to maintain a Sauter Mean Diameter D[3,2] of particles exiting the outlet orifice of less than 48 µm at a spray rate of 1.5-2 g/s. If the resulting spray rate from one insert is less than preferable, a plurality of inserts can be employed with an actuator body that comprises a plurality of secondary passages, inlet slots, nozzle chambers and posts to increase the spray rate above a desired minimum.

Thus, an improved aerosol dispenser assembly is disclosed which utilizes a compressed gas VOC-free propellant and which delivers particles with Sauter Mean Diameters (D [3, 2]) of less than 48 µm at a spray rate of 1.5 g/s or more. The improved dispenser comprises a nozzle comprising an actuator body and at least one nozzle insert. From one to six or more nozzle inserts are envisioned, depending upon the desired spray rate.

The actuator body comprises a primary delivery passage for receiving fluid. The primary delivery passage is in communication with at least one secondary fluid passage. Each secondary fluid passage is in communication with an inlet slot. Each inlet slot extends between its respective secondary fluid passage and a nozzle chamber. Each nozzle chamber accommodates a post. Each post is mateably received in a nozzle insert as described above and in greater detail below in connection with the drawings.

In a refinement, the aerosol dispenser assembly comprises from two to four secondary fluid passages, two to four inlet slots, two to four nozzle chambers, two to four posts and two to four swirl nozzle inserts.

A method for designing a swirl nozzle insert of an aerosol spray dispenser utilizing a compressed gas, VOC-free propellant is also disclosed. The disclosed method comprises identifying an upper limit for a Sauter Mean Diameter (D[3, 2]) and a lower limit for a spray rate and, adjusting at least one parameter selected from the group consisting of $d_o$, $D_s$, a cumulative inlet slot cross-sectional area $(d_p \times L_s \times N)$, $L_s$, $d_p$, $\beta$, $D$, $\theta_c$, $L_o$, $L_t$, $\theta_t$, and $N$ to maintain the Sauter Mean Diameter D[3,2] of particles below the upper limit at a spray rate in excess of the lower limit.

In a refinement, the method further comprises dividing the spray rate by an integer X that is less than or equal to 4 and the designing further comprises designing X inserts, secondary passages, inlet slots, nozzle chambers and posts for achieving a spray rate in excess of 1.5 g/s at a propellant pressure ranging from about 60 to about 140 psig.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 1 is a partial cross-sectional perspective view of an aerosol dispenser assembly made in accordance with this disclosure.

FIG. 2A is a front elevational view of an actuator body made in accordance with this disclosure.

FIG. 2B is a front elevational view of another actuator body made in accordance with this disclosure.

FIG. 2C is a front elevational view of yet another actuator body made in accordance with this disclosure.

FIG. 2D is a front elevational view of still another actuator body made in accordance with this disclosure.

FIG. 3A is a side elevational view of the actuator body shown in FIG. 2A.

FIG. 3B is a side elevational view of the actuator body shown in FIG. 2D.

FIG. 4 is a rear elevational view of the actuator body's shown in FIGS. 2A-3B.

FIG. 5A side sectional view of an insert suitable for use with the actuator bodies of FIGS. 2A-3B.

FIG. 5B is a perspective view of the insert shown in FIG. 5A.

FIG. 6A is a rear plan view of the insert shown in FIG. 5, particularly illustrating one configuration with four inlet slots.

FIG. 6B is a rear plan view of the insert shown in FIGS. 5A-5B, particularly illustrating configurations with two and three inlet slots.

FIG. 7A is a chart with data points for various design parameters used in the disclosed methodology in the design of metal swirl nozzle inserts.

FIG. 7B is a chart with data points for various design parameters used in the disclosed methodology in the design of plastic swirl nozzle inserts.

It should be understood that the drawings are not to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

As shown in FIG. 1, an aerosol dispenser assembly 10 includes a container 11 covered by a mounting cup 12. A mounting gasket (not shown) may be disposed between an upper rim of the container 11 and the underside of the mounting cup 12. A valve assembly 13 is used to selectively release the contents from the container 11 to the atmosphere. The valve assembly 13 comprises a valve body 14 and a valve stem 15. The valve stem 15 includes a lower end 16 that extends through a return spring 17. An actuator body 18 is mounted on top of the valve stem 15 and defines a primary passageway 19. The actuator body 18 is also connected to one or more if nozzle inserts 21 that each define an exit orifice shown generally at 22 and which will be discussed in greater detail below.

An upper rim 23 of the valve body 14 is affixed to the underside of the mounting cup 12 by a friction fit and the valve stem 15 extends through the friction cup 12. The actuator body 18 is frictionally fitted onto the upwardly extending portion 24 of the valve stem 15. The lower end 25 of the valve body 14 is connected to a dip tube 26. Gaskets may or may not be required between the valve body 14 and the mounting cup 12 and between the valve stem 15 and the mounting cup 12, depending upon the materials used for each component. Suitable materials will be apparent to those skilled in the art that will permit a gasket-less construction. Similarly, gaskets or seals are typically not required between the actuator body 18 and the upper portion 24 of the valve stem 15.

While the dispenser assembly 10 of FIG. 1 employs a vertical action-type actuator body or cap 18, it will be understood that other actuator cap designs may be used such as an actuator button with an integral over cap, a trigger actuated assembly, a tilt action-type actuator cap or other designs.

In operation, when the actuator body 18 is depressed, it forces the valve stem 15 to move downward thereby allowing pressurized liquid product to be propelled upward through the dip tube 26 and the lower portion 25 of the valve body 14 by the propellant. From the valve body 14, the product is propelled past the lower end 16 of the valve stem 14 through the channel 30 and through the stem orifice(s) 27, out the passageway 28 of the valve stem and into the primary passageway 19 of the actuator body 18. Preferably, two valve stem orifices 27 are employed as shown in FIG. 1 although a single valve stem orifice 27 or up to four valve stem orifices 27 may be used. Multiple valve stem orifices 27 provide greater flow and superior mixing of the product.

The use of the inserts 21 and posts 29 within the actuator body 18 is illustrated in greater detail FIGS. 2A-6B below. Turning to FIGS. 2A-2B, front elevational views of four different actuator bodies 18*a*-18*d* are shown. Each actuator body 18*a*-18*d* includes a different number of secondary passageways and nozzles (i.e. nozzle chamber, post and swirl nozzle insert). The number of secondary passageways and nozzles will depend upon the desired spray rate and the effective spray rate of each nozzle. Generally speaking, when compressed gas propellant is used, lower particle sizes result in the lower spray rates. Thus, the four nozzle design of FIG. 2C is effective for boosting the spray rate for formulations where is difficult to reduce the particle size (thereby resulting in reduced spray rate per nozzle) while the design of FIG. 2D will be effective for formulations where particle size is not problematic and therefore the spray rate per nozzle is relatively high.

In FIG. 2A, the actuator body 18*a* includes a primary passageway 19*a* that is connected to three different secondary passageways 31*a*-33*a*. In FIG. 2B, the primary passageway 19*b* of the actuator body 18*b* is connected to two secondary passageways 31*b*-32*b*. In FIG. 2C, the actuator body 18*c* includes a primary passageway 19*c* that is connected to four different secondary passageways 31*c*-34*c* while, in FIG. 2D, the primary passageway 19d may be directly connected to the nozzle chamber 37d. Again, the number of secondary passageways and nozzles may differ depending upon the particle size (Sauter Mean Diameter or D[3,2]) desired and the desired spray rate.

Figure 1:
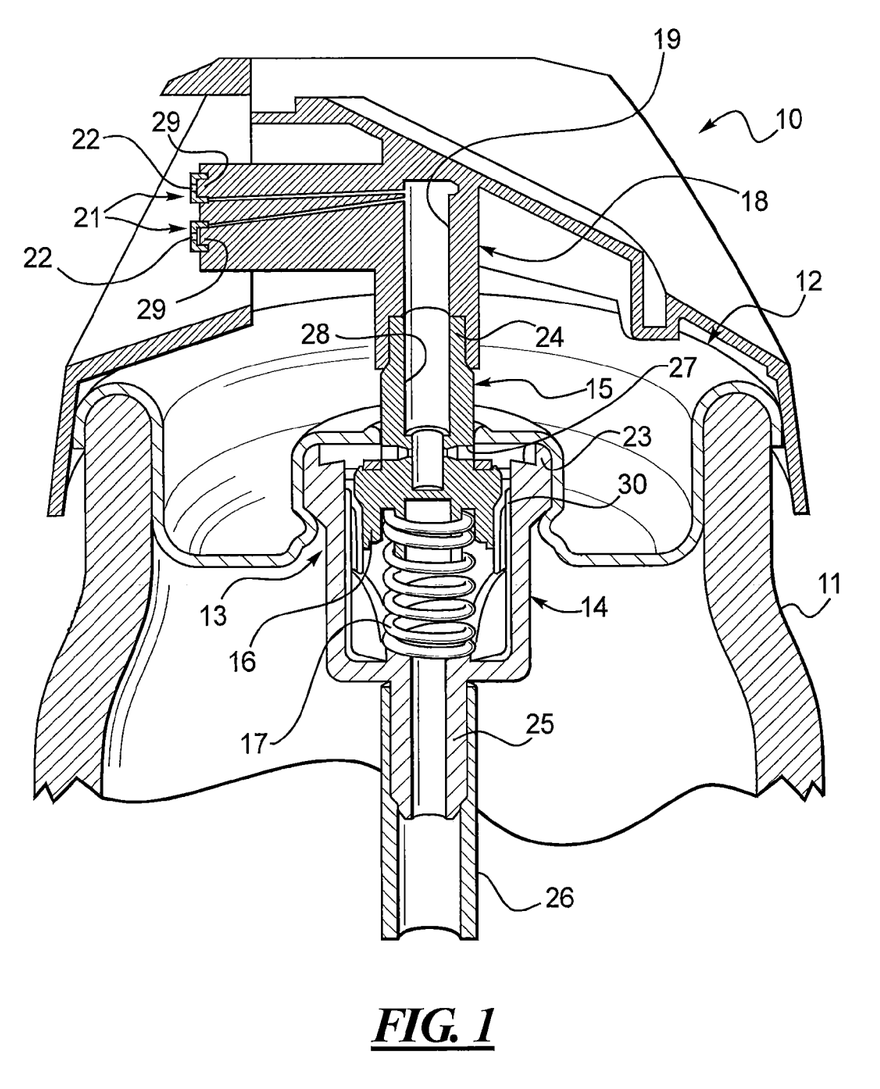
Figure 2A:
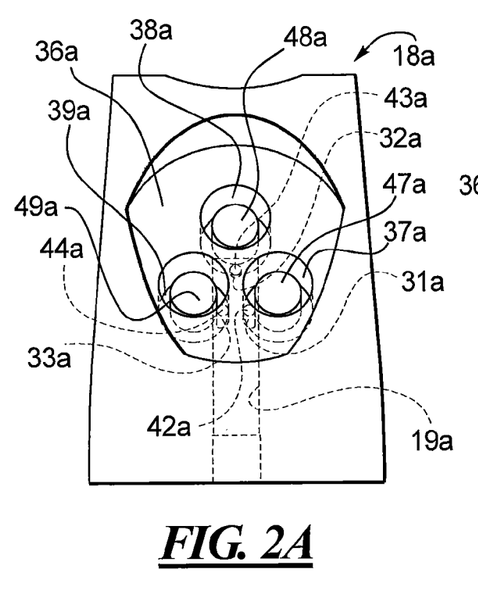
Figure 2B:
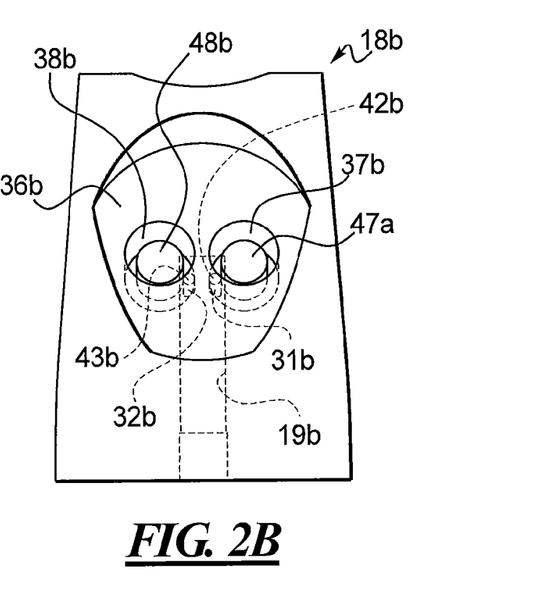
Figure 2C:
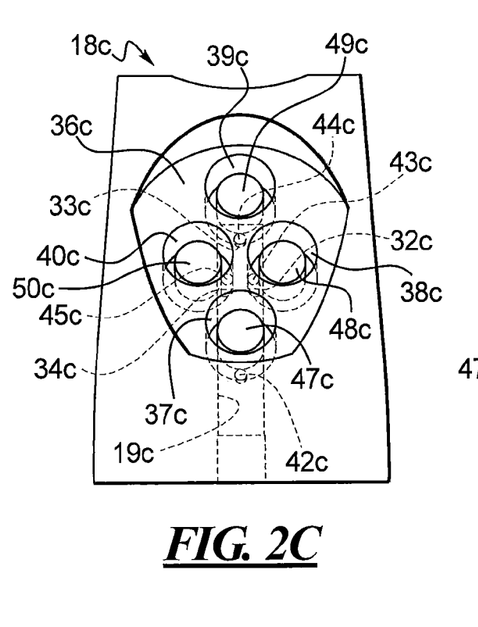
Figure 2D:
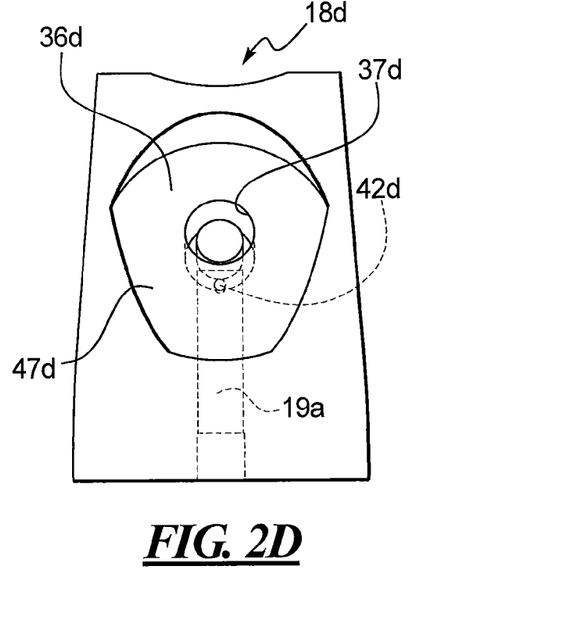

The actuator body 18a of FIG. 2A includes three nozzle chambers 37a, 38a, 39a; the actuator body 18b of FIG. 2B includes two nozzle chambers 37b, 38b; the actuator body 18c of FIG. 2C includes four nozzle chambers 37c-40c; and the actuator body 18d of FIG. 2D includes a single nozzle chamber 37d. An inlet slot can be considered to be the transition between each secondary passage 31-34 and its respective nozzle chamber 37-40. Inlet slots are shown at 42a-44a, 42b-43b, 42c-45c and at 42d in FIGS. 2A-2D respectively. Essentially, a nozzle chamber 37a-39a, 37b-38b, 37c-40c, or 37d is the space disposed in the actuator body 18a-18d below the recessed outer surface 36a-36d and above the secondary passages 31a-33a, 31b-32b, 31c-34c or 31d. More specifically, the nozzle chamber 37a-39a, 37b-38b, 37c-40c, or 37d is the space disposed between the inlet slots 42a-44a, 42b-43b, 42c-45c or 42c and the recessed outer surface 36a-36d of the actuator body 18a-18d. Each nozzle chamber 37a-39a, 37b-38b, 37c-40c or 37d accommodates a post 47a-49a, 47b-48b, 47c-50c or 47d which receives one of the swirl nozzle inserts 21.

Figure 3A:
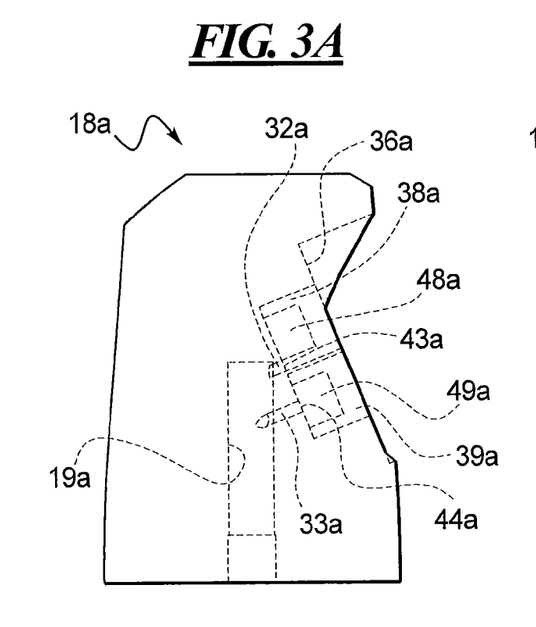
Figure 3B:
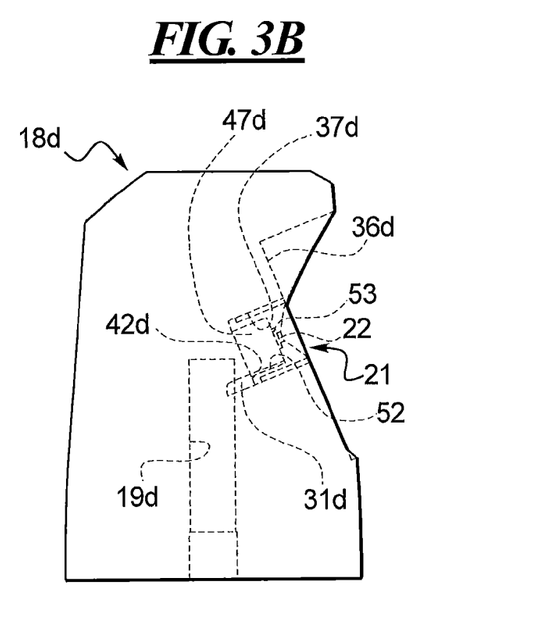

Turning to FIG. 3A, a left side view of the actuator body 18a of FIG. 2A is shown. The connection between the primary passage 19a and the secondary passages 33a and 32a are shown as the secondary passage 31a (see FIG. 2A) is hidden from view in FIG. 3A. FIG. 3B illustrates the nozzle chamber 37d of the actuator body 18d and the matable engagement of the insert 21 over the post 47d. The construction of the insert 21 will be discussed in greater detail below connection with FIGS. 5-6B. Between the inlet slot 42d, the post 47d and the insert 21 is an additional longitudinal slot 52 that may be formed in the insert 21, the post 47d or combination of the two. The slot 52 provides communication between the primary passage 19d, the secondary passage 31d, the inlet slot 42d (which may simply be a portion of or an extension of the secondary passage 31d) and the underside of the insert 21 which, in combination with the post 47d forms the swirl chamber 53.

Figure 4:
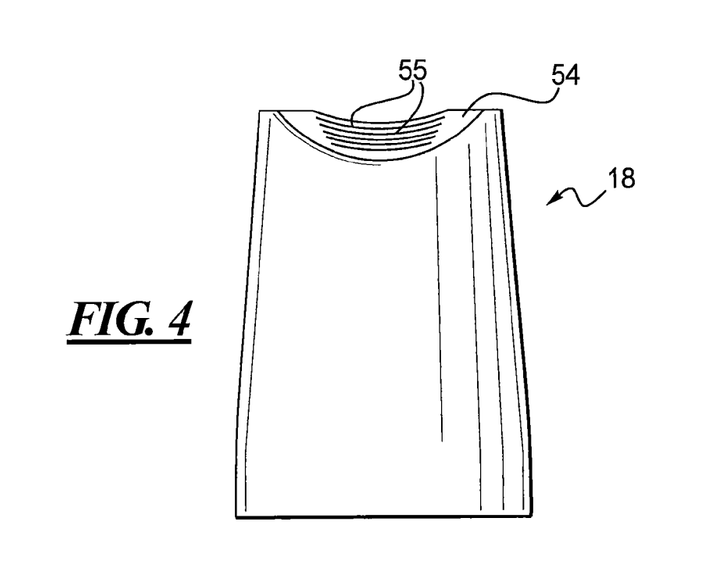

FIG. 4 is a rear elevational view of one embodiment of an actuator body 18. An upper surface 54 may be provided with a plurality of transverse ridges or slots 55 for serving as a finger grip. As noted above, in addition to the disclosed button-type actuator 18, additional types of actuators can be employed such as an actuator button with an integral overcap, a trigger-actuated assembly or the like.

Additional detail regarding the swirl nozzle inserts 21 is provided in FIGS. 5A-6B. Turning first FIGS. 5A and 5B, each insert 21 includes a cylindrical sidewall 61 connected to an end wall 62. The an outer surface 63 of the sidewall 61 may include a lip or rim 63' for purposes of frictionally engaging the inner sidewalls of a nozzle chamber 37-40. The inserts 21 snap into place with a secure friction fit. As high pressures approaching 200 psig may be employed, a tight fit between the insert 21 and actuator body 18 is required. A longitudinal slot 52 is shown in phantom in FIG. 5A and, again, communication from the secondary passage 31-34 to the end wall 62 of the insert 21 may be provided by a slot 52 disposed in the insert 21 or a longitudinal slot disposed in the post 47-50 or a combination of the two. Other alternatives will be apparent to those skilled in the art.

Figure 5A:
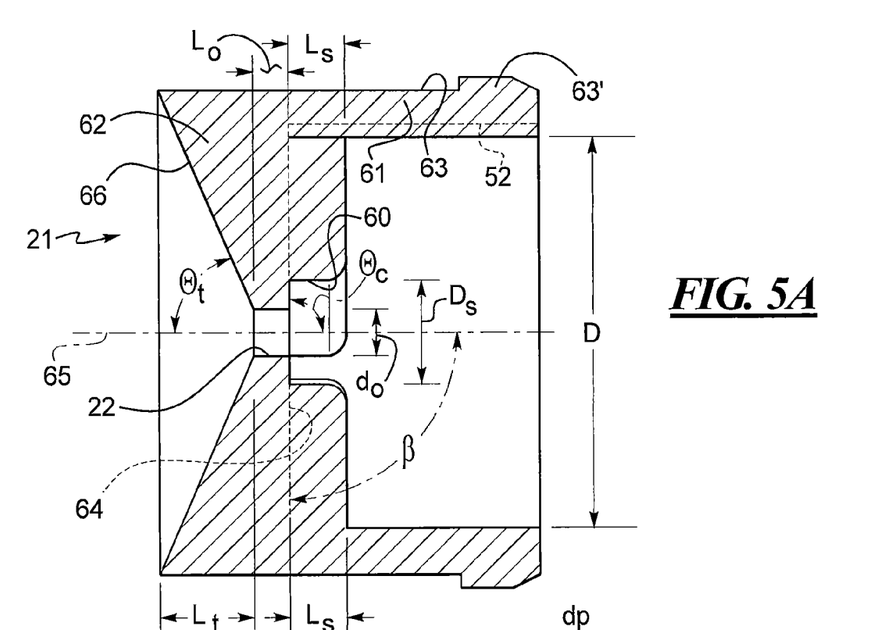
Figure 5B:
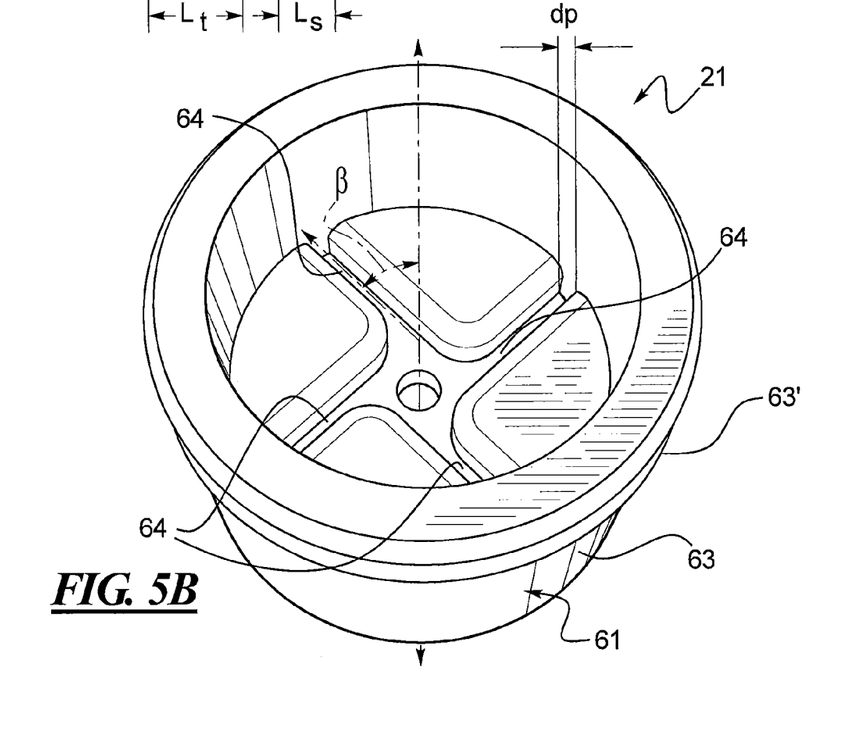
Figure 6A:
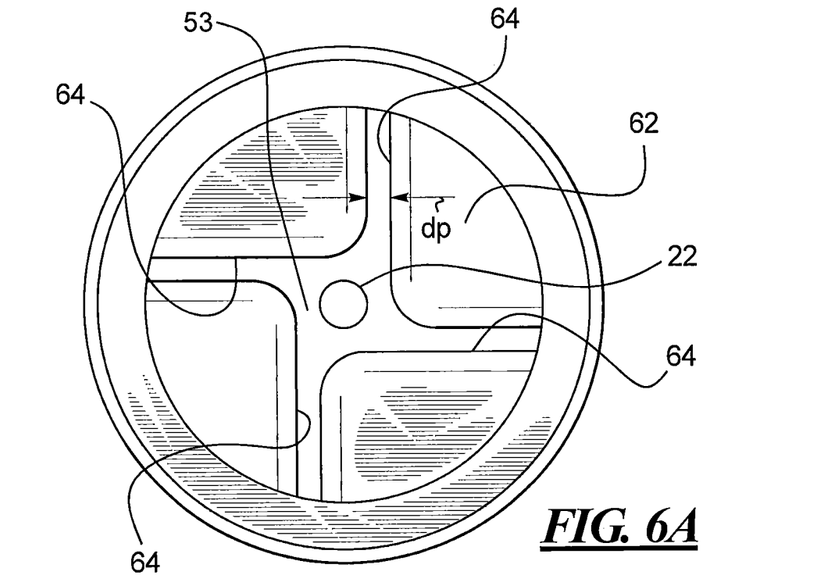
Figure 6B:
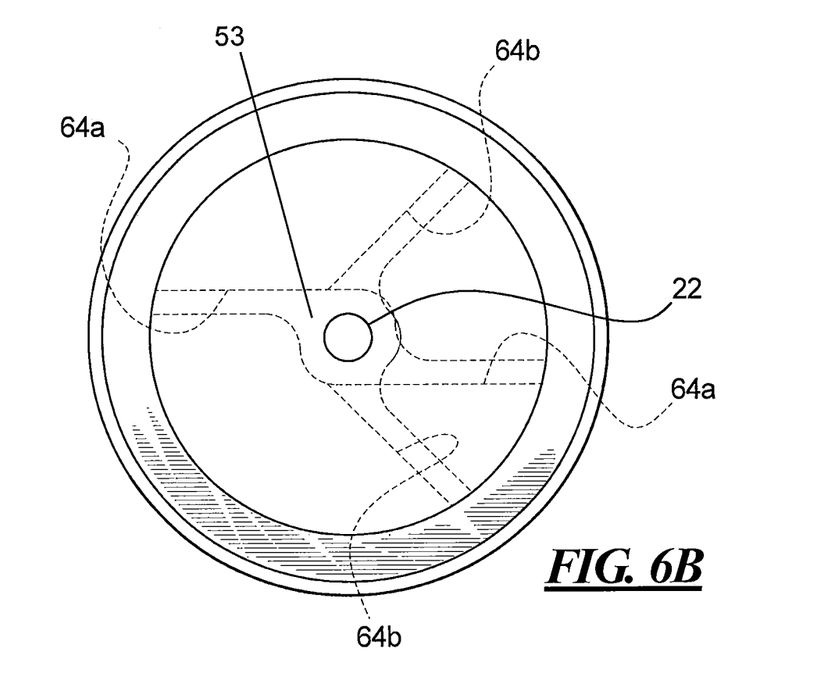

As discussed in greater detail in FIGS. 6A-6B, FIG. 5A nevertheless shows an inlet slot 64 in phantom lines. A better view of the inlet slots 64 is shown in FIG. 5B. The angular relationship between each inlet slot 64 and the axis 65 of the exit orifice 22 is best shown in FIG. 5B as the angle β. In both FIGS. 5A and 5B, the angle β is 90°. While β angles of greater than or less than 90° are not specifically shown in the drawings, such alternative β angles are possible and considered within the scope of this disclosure.

The end wall 62 of the insert 21 includes a plurality of recesses as best seen in FIGS. 6A-6B. Turning to FIG. 6A, the end wall 62 includes a central recess 63 that serves as a swirl chamber that surrounds the exit orifice 22. The swirl chamber 63 is in fluid communication with one or more inlet slots 64. As seen in FIGS. 6A and 6B, the number of inlet slots can vary. FIG. 6A illustrates an embodiment with four slots 64; FIG. 6B schematically illustrates a two slot configuration (see the slots labeled 64a) as well as a three slot configuration (see the slot on the left labeled 64a and the slots labeled 64b). A single inlet slot 64 embodiment is also envisioned as well as five and six inlet slot 64 configurations even though only 2, 3 and 4 slots configurations are specifically illustrated in FIGS. 6A-6B. The inlet slots 64 feed fluid flowing through one of the secondary passages 31-34, into one of the actuator body inlet slots 42-45 and past the posts 47-50 to the swirl chamber 63. Centralized within the swirl chamber 63 is the outlet orifice 22.

The design dimensions and parameters of the insert 21 will now be described. The nomenclature for the design parameters discussed herein is consistent with the article by Xue et al., "Effect of Geometric Parameters on Simplex Atomizer Performance," AIAA Journal, Vol. 42, No. 12 (December 2004), which is incorporated herein by reference. The design parameters discussed herein are directed toward typical commercial aerosol canned products utilizing a compressed gas propellant (VOC-free) provided at a pressure ranging from about 60 to about 140 psig, a target discharge or spray rate of 1.5-2 g/s and a formula that comprises primarily water, less than 7 wt % ethanol and about 0.3 wt % fragrance oil. The target Sauter Mean Diameter D[3,2] is less than 50 μm.

Referring back to FIG. 5A, the diameter $D_s$ of the swirl chamber 53 is the transverse internal diameter of the recess that forms the swirl chamber 53. Without being bound by any particular theory, it has generally been determined that a larger swirl chamber is useful for the typical aerosol air fragrance product using a compressed gas propellant as discussed above. In an embodiment, the swirl chamber diameter $D_s$ is preferably greater than 1100 μm, although that value may vary depending upon the other parameters discussed herein.

The exit orifice diameter $d_o$ is the internal diameter of the exit orifice 22. In an embodiment, the exit orifice diameter $d_o$ is less than about 210 μm although the exit orifice diameter $d_o$ may approach 300 μm, depending upon the values for the other design parameters. For example, (D[3,2]) values of 52.6 μm have been achieved with an exit orifice diameter $d_o$ of 300 μm and with a swirl chamber diameter $D_s$ of 1,776 μm. Thus it is envisioned that a large orifice diameter $d_o$ of about 300 μm employed with a larger swirl chamber diameter $D_s$ may provide the desired low particle size.

Other parameters include the dimensions of the inlet slots 64 including the slot width $d_p$, slot height $L_s$, and number N of inlet slots 64. One particularly useful parameter is the cumulative cross-sectional slot 64 area, $d_p \times L_s \times N$. As too high of a cross-sectional area for these inlet slots 64 would reduce the flow rate into the swirl chamber 53, in an embodiment, the cumulative cross-sectional area of the inlet slots 64 ($d_p \times L_s \times N$) is preferably less than about 30,625 μm².

Other important parameters for maintaining a Sauter Mean Diameter D[3,2] of less than 48 μm at a spray rate of 1.5-2 g/s include, but are not limited to: the inner diameter D of the insert 21 (see FIG. 5A); the angle 13 at which the inlet slot(s) 64 enter the swirl with respect to the axis 65 of the outlet orifice 22; and the angle $\theta_c$ which is the angle between the inner or bottom surface of the swirl chamber 53 encircling the outlet orifice 22 and the axis 65 of the outlet orifice 22; the axial length $L_o$ of the outlet orifice 22; the axial length $L_t$ of the outer trumpet surface 66 of the end wall 62 of the insert 21 that extends beyond the outlet orifice 22; and the angle $\theta_t$ of trumpet surface 66 with respect to the axis 65 of the outlet orifice 22. Any one or more of these parameters may be used to achieve the desired particle size (D[3,2]<50 μm) at the desired spray rate (1.5-2 g/s).

Figure 7A:
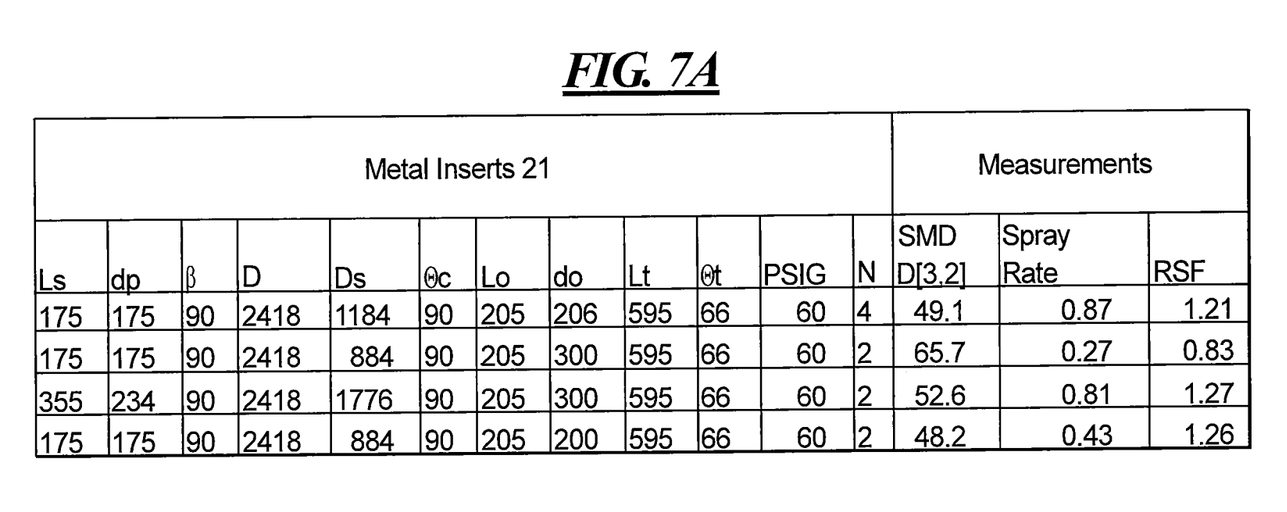
Figure 7B:
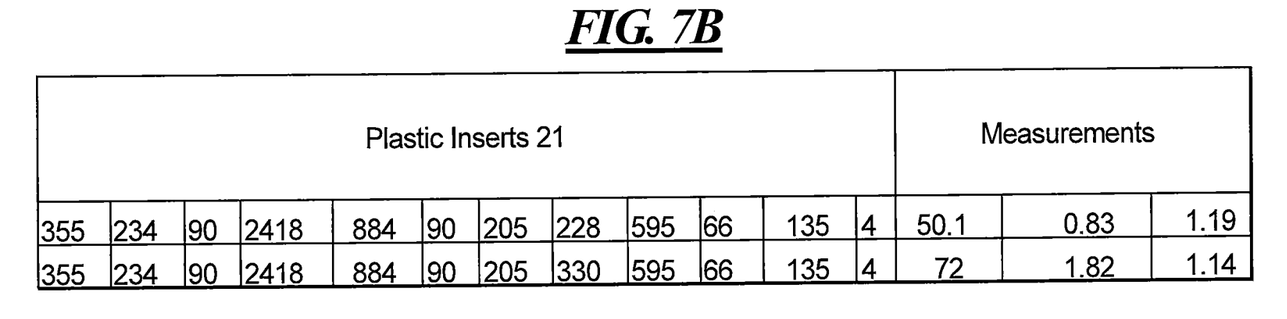

Data for all of the above-referenced parameters is presented in FIG. 7A for metal inserts 21 and FIG. 7B for plastic inserts 21. $L_s$, $d_p$, D, $D_s$, $L_o$, $d_o$ and $L_t$ are in micrometers; β, $\theta_c$, $\theta_t$ are in degrees (°), PSIG is the internal container pressure (in psig), spray rate is in g/s and RSF is the relative diameter span factor which characterizes the particle diameter span or range with respect to the median diameter. The relative diameter span factor RSF is calculated from the formula: RSF=$D_{0.9}$−$D_{0.1}$/$D_{0.5}$ where $D_{0.9}$ is the 90th percentile diameter from a diameter distribution curve, $D_{0.1}$ is the 10th percentile diameter from the diameter distribution curve, and $D_{0.5}$ is the median diameter from the diameter distribution curve. See, Bayvel be & Orzechowski, *Liquid Atomization*, p. 156-58 (1993).

While only certain embodiments have been set forth, alternatives and modifications will be apparent from the above description to those skilled in the art. These and other alternatives are considered equivalents and within the spirit and scope of this disclosure and the appended claims.

INDUSTRIAL APPLICABILITY

An improved aerosol dispenser is provided using a compressed gas propellant free of volatile organic compounds and that includes an actuator cap/swirl nozzle insert combination for providing a reduced particle size at the desired spray rates.

What is claimed:

1. An aerosol dispenser system comprising:
    an enclosed container accommodating a liquid product and being pressurized with a VOC-free compressed gas propellant;
    a valve assembly coupled to and in fluid communication with the container;
    an actuator body coupled to and in fluid communication with the valve assembly; and
    at least two swirl nozzle inserts coupled to and in fluid communication with the actuator body, the at least two swirl nozzle inserts comprising a cylindrical side wall connected to an end wall, the cylindrical sidewall having a diameter D less than 4,000 μm defining an open bottom, the end wall comprising a recess that defines a swirl chamber, the end wall further comprising an outlet orifice connected to the swirl chamber and the end wall further comprising at least one inlet slot extending inward from a junction of the cylindrical sidewall and end wall towards the swirl chamber,
    the outlet orifice having a diameter $d_o$ and an axial length $L_o$, the axial length $L_o$ being less than 250 μm, the swirl chamber having a diameter $D_s$, the inlet slot comprising a width $d_p$, a height Ls, and a cross-sectional area $d_p \times L_s$ defined by said width $d_p$ and height $L_s$, number of inlet slots N ranging from 1 to 6,
    $d_o$, $D_s$ and a cumulative cross-sectional area of the N slots, $d_p \times L_s \times N$, being optimized to maintain a Sauter Mean Diameter D[3,2] of particles exiting the outlet orifice of less than 51 μm at an output rate of at least 1.5 g/s when the aerosol dispensing system is charged with an aqueous product and pressurized with an VOC-free, compressed gas propellant.

2. The aerosol dispenser of claim 1 wherein $d_o$ is less than about 210 μm.

3. The aerosol dispenser of claim 1 wherein $D_s$ is between 2,000 and 3,000 μm.

4. The aerosol dispenser of claim 1 wherein the cumulative cross-sectional area of the N slots, $d_p \times L_s \times N$, is less than about 170,000 μm².

5. The aerosol dispenser of claim 1 wherein the at least two swirl nozzle inserts comprise from 2 to 4 swirl nozzle inserts and the spray rate ranges from about 1.5 to about 2 g/s.

6. An aerosol dispenser and product assembly comprising:
    a nozzle comprising at least two swirl nozzle inserts and an actuator body, each swirl nozzle insert comprising a cylindrical side wall connected to an end wall, the cylindrical sidewall defining an open bottom and having an inner diameter D less than 4,000 μm, the end wall comprising a recess that defines a swirl chamber having a diameter $D_s$, the end wall further comprising an outlet orifice having a diameter $d_o$ connected to the swirl chamber and the end wall further comprising at least one inlet slot extending inward from a junction of the cylindrical sidewall and end wall towards the swirl chamber, the inlet slot comprising a width $d_p$, a height Ls, and a cross-sectional area $d_p \times L_s$, a number of inlet slots N ranging from 1 to 6, the at least one inlet slot entering the swirl chamber at an angle β with respect to an axis of the outlet orifice, an inner surface of the swirl chamber encircling the outlet orifice and being disposed at an angle $\theta_c$ with respect to the axis of the outlet orifice, the outlet orifice having an axial length $L_o$ of less than 250 μm, the end wall of the insert comprising an outer trumpet surface having an axial length $L_t$ extending beyond the outlet orifice, the trumpet surface having an angle $\theta_t$ with respect to the axis of the outlet orifice,
    the actuator body being coupled to and in communication with a valve assembly that is coupled to an in communication with an enclosed container that accommodates product that is a liquid a room temperature, the container being pressurized with a VOC-free compressed gas propellant,
    at least one parameter selected from the group consisting of X, $d_o$, $D_s$, a cumulative cross-sectional area of the N slots ($d_p \times L_s \times N$), $L_s$, $d_p$, β, D, $\theta_c$, $L_o$, $L_t$, $\theta_t$, and N being optimized to maintain a Sauter Mean Diameter D[3,2] of particles exiting the outlet orifice of less than 51 μm and a spray rate of at least 1.5 g/s.

7. The aerosol dispenser and product assembly of claim 6 wherein $d_o$ is less than about 210 μm.

8. The aerosol dispenser and product assembly of claim 7 wherein $D_s$ is between 2,000 and 3,000 μm.

9. The aerosol dispenser and product assembly of claim 7 wherein the cumulative cross-sectional area of the N slots, $d_p \times L_s \times N$, is less than about 170,000 μm².

10. An aerosol dispenser assembly comprising:
    a nozzle comprising an actuator body and at least two nozzle inserts,
    the actuator body comprising a primary delivery passage for receiving fluid, the primary delivery passage being in communication with at least two secondary fluid passages,
    the secondary fluid passages being in communication with two inlet slots, the inlet slots extending between the secondary fluid passages and two nozzle chambers, the nozzle chambers accommodating one of two posts, each post being mateably received in a nozzle insert, the nozzle inserts each comprising a cylindrical side wall connected to an end wall, the cylindrical sidewall having a diameter D less than 4,000 μm defining an open bottom that receives the post, the end wall comprising a recess that, in combination with the post, defines a swirl chamber, the end wall further comprising an outlet orifice connected to the swirl chamber and the end wall further comprising N inlet slots extending inward from a junction of the cylindrical sidewall and end wall towards the swirl chamber wherein N ranges from 1 to 6, the outlet orifice having a diameter $d_o$ and an axial length $L_o$, the axial length $L_o$ being less than 250 μm, the swirl chamber having a diameter $D_s$, the inlet slot comprising a width $d_p$, a height Ls, and a cross-sectional area $d_p \times L_s$ defined by said width $d_p$ and height $L_s$, $d_o$, $D_s$ and a cumulative cross-sectional area of the N slots, $d_p \times L_s \times N$, being optimized to maintain a Sauter Mean Diameter D[3,2] of particles exiting the outlet orifice of less than 51 μm and a spray rate of at least 1.5 g/s when the particles are a water-based product pressurized with a VOC-free compressed gas.

11. The aerosol dispenser assembly of claim 10 wherein an initial pressure of the propellant is less than 72 psig.

12. The aerosol dispenser assembly of claim 10 wherein $d_o$ is less than about 210 μm.

13. The aerosol dispenser assembly of claim 10 wherein the primary fluid passage is in communication with three secondary fluid passages and the assembly further comprises three inlet slots, three nozzle chambers, three posts and three swirl nozzle inserts.

14. The aerosol dispenser assembly of claim 10 wherein the primary fluid passage is in communication with four secondary fluid passages and the assembly further comprises four inlet slots, four nozzle chambers, four posts and four swirl nozzle inserts.

15. The aerosol dispenser assembly of claim 10 wherein the cumulative cross-sectional area of the N slots, $d_p \times L_s \times N$, of each insert is less than about 170,000 m².

16. A method for determining design parameters for at least two swirl nozzle inserts of an aerosol spray dispenser utilizing a compressed gas, VOC-free propellant, the method comprising:

identifying an upper limit for a Sauter Mean Diameter (D[3, 2]) of less than 51 μm and a lower limit for a spray rate of at least 1.5 g/s, designing the swirl nozzle insert with a cylindrical side wall connected to an end wall, the cylindrical sidewall having a diameter D less than 4,000 μm defining an open bottom and having an inner diameter D, the end wall comprising a recess that defines a swirl chamber having a diameter $D_s$, the end wall further comprising an outlet orifice having a diameter $d_o$ connected to the swirl chamber and the end wall further comprising N inlet slots extending inward from a junction of the cylindrical sidewall and end wall towards the swirl chamber, the inlet slot comprising a width $d_p$, a height Ls, and a cross-sectional area $d_p \times L_s$, the number of inlet slots N ranging from 1 to 6, the N inlet slots entering the swirl chamber at an angle β with respect to an axis of the outlet orifice, an inner surface of the swirl chamber encircling the outlet orifice and being disposed at an angle $\theta_c$ with respect to the axis of the outlet orifice, the outlet orifice having an axial length $L_o$, the axial length $L_o$ being less than 250 μm, the end wall of the insert comprising an outer trumpet surface having an axial length $L_t$ extending beyond the outlet orifice, the trumpet surface having an angle $\theta_t$ with respect to the axis of the outlet orifice, adjusting at least one parameter selected from the group consisting of $d_o$, $D_s$, a cumulative cross-sectional area of the N slots ($d_p \times L_s \times N$), $L_s$, $d_p$, β, D, $\theta_c$, $L_o$, $L_t$, $\theta_t$, and N being optimized to maintain the Sauter Mean Diameter D[3,2] of particles below the upper limit at a spray rate in excess of the lower limit.

17. The method of claim 16 further comprising dividing the spray rate by an integer X that is between 2 and 4 and the designing comprises designing X inserts and designing an actuator body with a primary fluid passage that is in communication with X secondary fluid passages, each in communication with its own inlet slot that extends between its own secondary fluid passage and its own nozzle chamber, each nozzle chamber accommodating a post, each post being natively received in its own swirl nozzle insert.

18. The method of claim 16 wherein an initial pressure of the propellant is less than 72 psig.

* * * * *